US007016981B2

(12) United States Patent  
Ervin

(10) Patent No.: US 7,016,981 B2  
(45) Date of Patent: Mar. 21, 2006

(54) SWITCHING APPARATUS AND METHOD FOR INCREASING THE TOTAL NUMBER OF ADDRESSABLE ELECTRONIC DEVICES BEYOND LIMITS IMPOSED BY DEVICE ADDRESS SIZES

(75) Inventor: Joseph J. Ervin, Stow, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 602 days.

(21) Appl. No.: 10/238,034

(22) Filed: Sep. 9, 2002

(65) Prior Publication Data

US 2004/0049651 A1 Mar. 11, 2004

(51) Int. Cl.  
G06F 3/00 (2006.01)

(52) U.S. Cl. .............. 710/1; 710/2; 710/5; 710/10; 710/33; 710/36; 710/305; 711/202; 711/206; 712/405

(58) Field of Classification Search ............ 710/2, 710/5, 10, 20, 33, 36, 305; 712/405; 711/202, 711/206

See application file for complete search history.

(56) References Cited

U.S. PATENT DOCUMENTS

| | | | | |
|---|---|---|---|---|
| 5,991,233 A | * | 11/1999 | Yu ........................ | 365/238.5 |
| 6,212,194 B1 | * | 4/2001 | Hsieh ..................... | 370/414 |
| 6,430,636 B1 | * | 8/2002 | Cranston et al. .......... | 710/107 |
| 6,888,837 B1 | * | 5/2005 | Cunningham et al. ..... | 370/401 |
| 2002/0041413 A1 | * | 4/2002 | Wang et al. .............. | 359/128 |

* cited by examiner

Primary Examiner—Kim Huynh  
Assistant Examiner—Angel L. Casiano  
(74) Attorney, Agent, or Firm—Kudirka & Jobse, LLP

(57) ABSTRACT

A switching apparatus provides an address extension for an environment, such as I²C, that uses devices with a limited address configurability. The switching apparatus provides connection between a main bus and one or more secondary busses to which additional devices are connected. The switching apparatus detects an address on the main bus, and determines whether it is intended for a device on a secondary bus. If so, it connects the main bus to the proper secondary bus where the device in question is located. It then translates the address to an address within the limited configurability of the devices, and places the translated address on the secondary bus where the addressed device is located.

34 Claims, 5 Drawing Sheets

CONTROL REGISTER

— FILT_EN
—TRANS_EN

REVISION REGISTER

| MAJOR | MINOR |

ADDRESS REGISTER

| ADDRESS | 0 |

RESET REGISTER

STATUS REGISTER

— AUTOCONFIG
— CFG_IN#
— CFG_OUT#

SWITCHING APPARATUS AND METHOD FOR INCREASING THE TOTAL NUMBER OF ADDRESSABLE ELECTRONIC DEVICES BEYOND LIMITS IMPOSED BY DEVICE ADDRESS SIZES

FIELD OF THE INVENTION

This invention relates generally to the field of communications between various digital components connected to a common data bus and, more specifically, to increasing the address configurability for such devices.

BACKGROUND OF THE INVENTION

Many conventional commercial products, including computer systems as well as other digitally controlled products, have integrated circuits (ICs) that must communicate with one another. One way of implementing this communication is through the use of a data bus via which digital information is transmitted. Such busses take different forms. One type of bus is a two-way, two-line connection between different ICs or modules referred to as the "I$^2$C" bus. Although there are other busses as well, the I$^2$C bus is exemplary for the purposes herein.

The I$^2$C bus uses two active wires and a ground connection. The active wires are referred to as the "serial data line" (SDA) and the "serial clock line" (SCL). The signaling methods used with the I$^2$C bus make use of unique addresses assigned to each of the devices connected to the bus. The bus protocol involves a "master/slave" arrangement in which a device that initiates a data transfer is recognized as the "master" while other devices are the "slaves."

The most common form of I$^2$C uses 7-bit addressing, allowing for a maximum of 128 unique device addresses. Device addresses appear on the bus with an eighth bit appended in the least significant position as a "1" or "0" to indicate whether a given transaction is a read or write, respectively. Thus, a given device may consume two bus-form addresses, given in hexadecimal as, for example, A0h (write) and A1h (read). The I$^2$C addresses listed for devices in the remainder of this document will use this bus-form address notation, with <0>for the read/write bit.

Since the I$^2$C bus protocol makes no provisions for automatic assignments of device addresses to slave devices, standard I$^2$C devices must be hardware-configured such that each device knows its unique slave address unambiguously. On typical I$^2$C integrated circuits, this address selection is performed via the hard-wiring of a set of device pins to logic HIGH or LOW, corresponding to some or all of the bits of the I$^2$C 7-bit address. Thus, when an I$^2$C transaction is issued on the bus, each slave device can discern, based upon address, the transactions in which it needs to participate as a slave, and which to ignore. Due to low-cost design goals applied to most standard I$^2$C slave devices, the number of such address-select pins is typically limited to three. Thus, a manufacturer of an I$^2$C slave device selects permanently the upper 4-bits of the device's I$^2$C address, allowing the system designer to configure the lower 3-bits via the address-selection pins, limiting the number of unique selectable I$^2$C addresses to eight. Thus, although the I$^2$C address map affords 128 unique slave addresses, a system designer may typically be limited to a maximum of eight instances of a given device type. This limitation is referred to as "address exhaustion."

Manufacturers of I$^2$C slave devices typically assign different address ranges to devices that perform different functions. For example, I$^2$C serial EEPROM devices typically have device addresses in the Axh range (A0h, A2h, A4h, A6h, A8h, AAh, ACh, AEh), where bits <3:1>are selected via address-selection pins as described above. Similarly, a general-purpose input-output device may have addresses in the 40–4Eh range. If a system designer requires more similar devices than the devices' address-selection pins can accommodate, then special mechanisms must be employed to ensure that all such devices are uniquely addressable.

The common solution in the prior art for the limited address space of the I$^2$C bus is the use of an "I$^2$C multiplexer." An example of such a multiplexer is the "PCA9544 4-channel I$^2$C Multiplexer and Interrupt controller" made by Philips Semiconductors, Sunnyvale, Calif. The use of the multiplexer divides the bus into a main segment and a number of subsegments. The multiplexer connects only one of the subsegments to the main segment at any point in time. An arrangement such as this is shown schematically in FIG. 1.

FIG. 1 shows an I$^2$C system wherein an I$^2$C multiplexer is used to overcome the address exhaustion problem described above. As shown in the figure, the two signal lines of the bus, SDA and SCL connect to a master device 10, slave devices 12, having hexidecimal addresses 42h and 44h, respectively, and an I$^2$C multiplexer device 14. Four pairs of signal lines 16 extend from the multiplexer with each pair forming an I$^2$C subsegment. Each subsegment 16 has connected to it eight slave devices, shown at addresses A0h, A2h, A4h, A6h, A8h, AAh, ACh, and AEh. The aforementioned multiplexer is a 1-of-4 bidirectional multiplexer, providing four subsegments. With this arrangment of slave devices attached to each subsegment, the multiplexer may be used to increase the number of similar slave devices.

The control of an I$^2$C multiplexer such as that of FIG. 1 is accomplished by explicit I$^2$C transactions performed on the main bus by the master device. Using this control mechanism, the master device communicates with control registers internal to the multiplexer itself, selecting one of the four subsegments to be electrically connected to the main bus. Once this bus selection is made, the set of slave devices visible to the master device includes those on the selected subsegment and those on the main bus. Since only one subsegment is seen by the master at a time, the subsegment slave devices on the different subsegments share slave addresses. Thus, the master device must properly coordinate the subsegment selection via the multiplexer device with the slave address issued on the bus to ensure that the proper slave device is accessed in a given transaction.

A problem with the use of multiplexers such as that shown in FIG. 1 is that an I$^2$C master on the main bus is required to perform two separate bus operations to access a slave device; one to switch the multiplexer, and one to access the slave on the selected subsegment. However, the multiplexer approach is typically limited to use with one master device. This is because, if more than one independent master was to access the bus at the same time, one master could inadvertently switch the multiplexer after another master had selected its desired subsegment, but before the other master had completed its transaction to the desired slave device, leading to errors in operation.

SUMMARY OF THE INVENTION

In accordance with the present invention, a switching apparatus is provided that allows the total number of devices that are accessible to be increased beyond the limit imposed by a limited addressibility of such devices, such as exists in many I²C devices. The switching apparatus facilitates communication between a first device connected to a main communications bus and a second device connected to a secondary communications bus. In the preferred embodiment, a single switching apparatus can provide a coupling path between the primary bus and any of a plurality of secondary busses. The switching apparatus itself includes a first interface connected to the main bus and a second interface connected to the secondary bus, and can establish a coupling path between the two busses. Upon receiving an address placed on the main bus, the switching apparatus employs an address translator to convert the address received on the primary bus to a secondary address that is placed the secondary bus. Since the primary bus may be connected to a plurality of secondary busses via the switching apparatus, the particular address on the main bus may also be interpreted by the switching apparatus to select one of the several secondary busses to which the main bus may be coupled. The translated address that is placed on the selected secondary bus will only be seen on that bus. Therefore, secondary addresses may have the same format on multiple secondary busses, but correspond to unique primary addresses on the primary bus. Thus, there may be more independent addresses on the main bus than are uniquely identifiable by the devices on the secondary busses.

The switching apparatus may be implemented using a microcontroller via which the interface, the coupling path and the address translator are configured. The address translator may comprise an address filter bitmap. In such a case, the address from the main bus is used to index into the bitmap to a particular bit. The logic state of the located bit determines whether the address identifies a device on one of the secondary busses connected to the switching apparatus. A routing table may also be used, the main bus address being used to identify a particular section of the routing table the data contents of which indicate to which of the secondary busses a coupling path is to be established from the main bus.

To determine the new address, a page table may be used by the switching apparatus. Since the secondary busses are isolated from one another, the same addresses may be used on each of them. Preferably, the page table has entries that comprise offset values. The particular offset value is determined by the specific address from the main bus. A destination address on a secondary bus is then determined by combining the resulting offset value with the main bus address itself. One additional feature that may be included is the ability to daisy chain an enabling function between multiple switching apparatuses so that they are sequentially enabled during an initialization process. This ensures that a configuration host only communicates with one of the switching apparatuses at a time.

BRIEF DESCRIPTION OF THE DRAWINGS

The above and further advantages of the invention may be better understood by referring to the following description in conjunction with the accompanying drawings in which.

DETAILED DESCRIPTION

Figure 1:
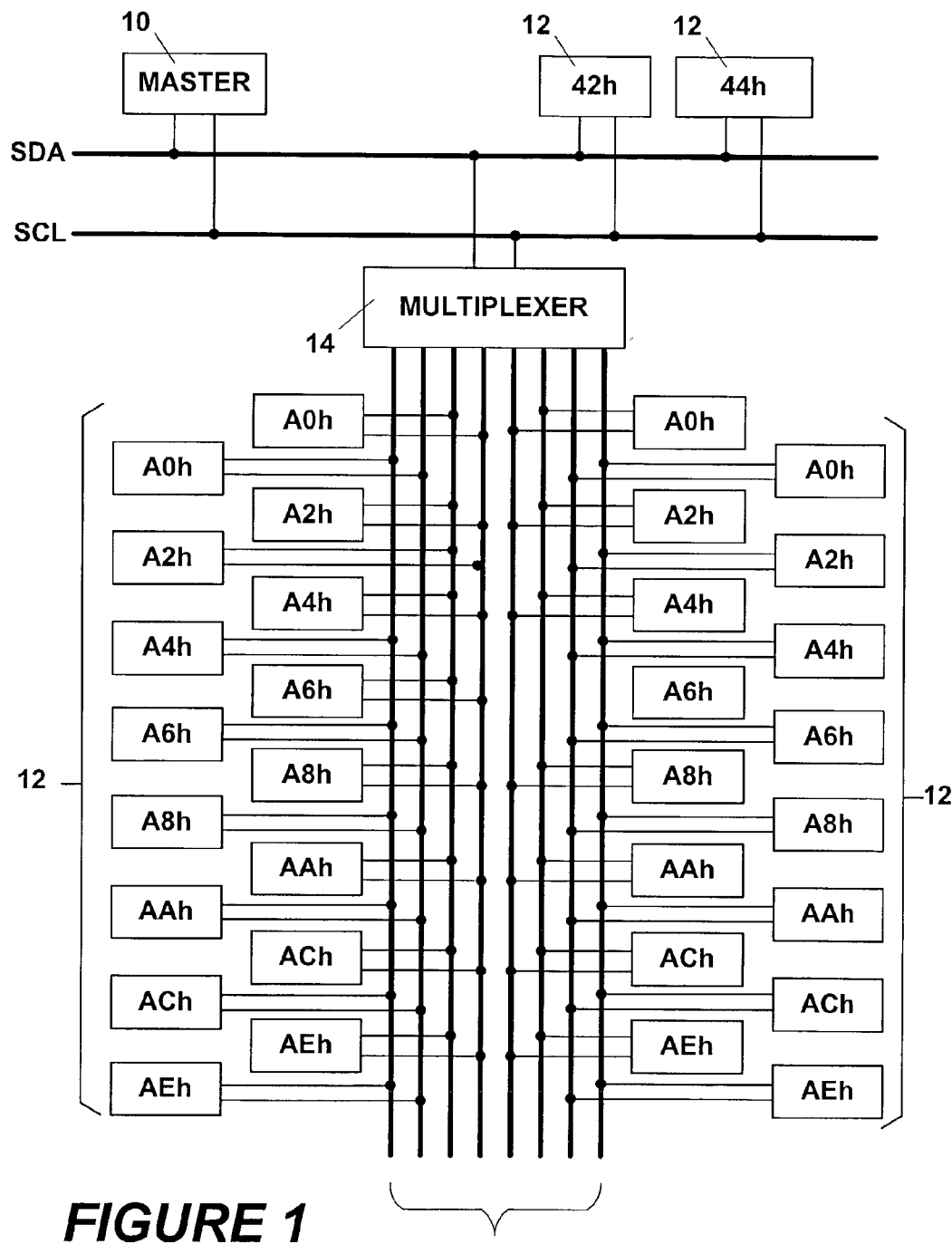
FIG. 1 shows a prior art configuration in which a multiplexer is used to increase the number of accessible devices from a main communications bus.
Figure 2:
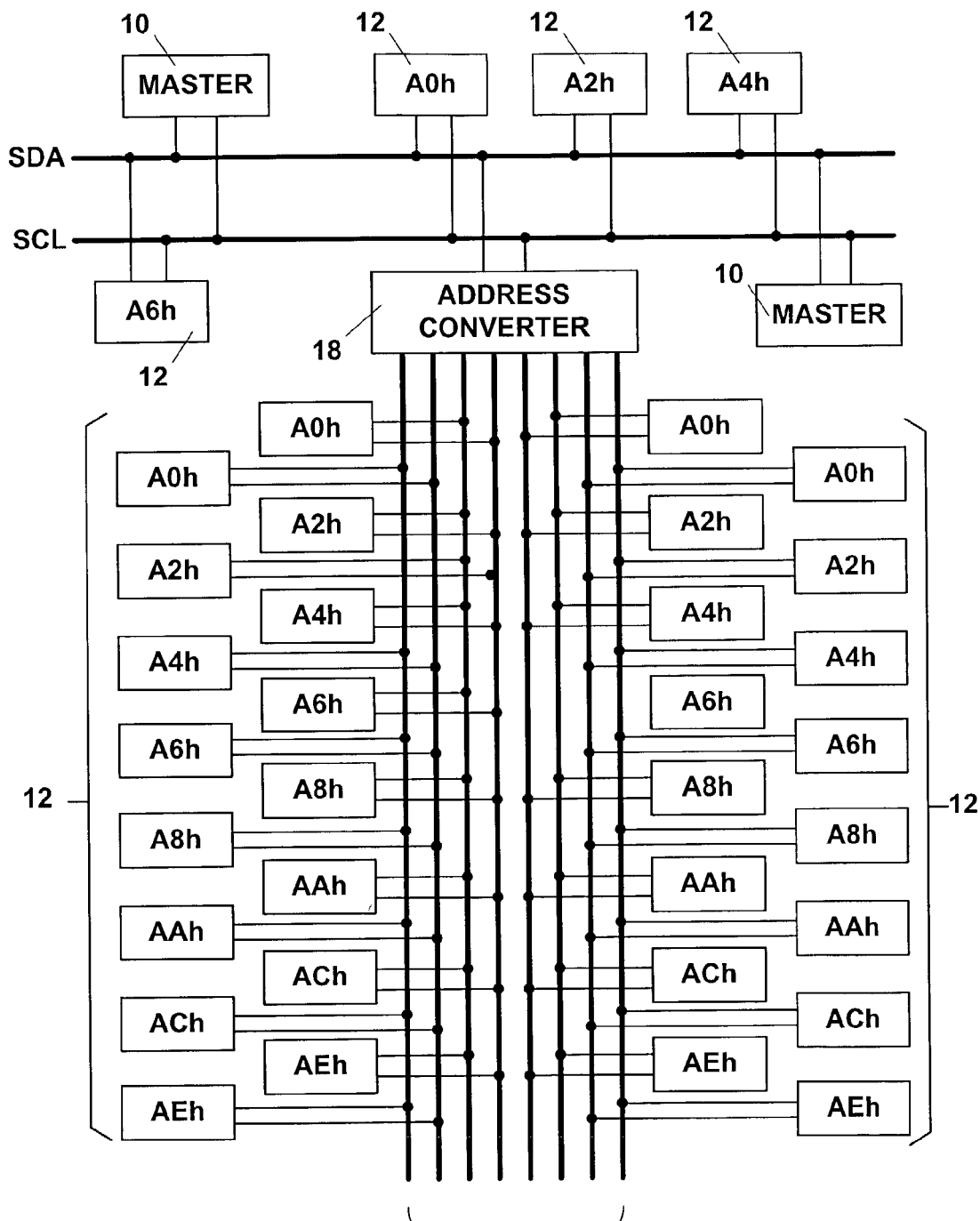
FIG. 2 depicts a configuration of the present invention in which an address extender is used to provide access from the main bus to additional devices, all of which are uniquely addressable.

The arrangement shown in FIG. 2 is similar to that of FIG. 1, but in place of a multiplexer is used address extender 18. The extender is a one-to-four bus switch that receives transactions on its one slave port and forwards them to one of four master ports, based upon address. Because the extender 18 performs automatic routing from the "upstream" bus to one of the "downstream" busses 26 based on address, a master 10 driving a transaction on the upstream bus need not perform any special routing or steering operations on a transaction-by-transaction basis, as is required in the prior art system of FIG. 1. Rather, the association of the upstream addresses with downstream busses is programmed at reset time by a master device on the upstream (primary) bus. Thereafter, masters on the upstream bus may communicate with any slaves on the four downstream busses and the extender will automatically route the transactions to the correct port.

The preferred embodiment is a 1-to-4 port I²C switch. When used in the exemplary application as shown in FIG. 2, the switch allows eight of the aforementioned exemplary slave devices on each of the four secondary busses, similar to the prior art shown in FIG. 1. However, because all of these can be mapped to unique addresses as viewed from the primary bus, the system can accommodate up to eight more of the exemplary slave devices on the primary bus (although only four are shown in FIG. 2), bringing the total to forty. The devices of the upstream bus have pre-assigned addresses (typically assigned by the device manufacturers) in the range of Axh (i.e., A0h, A2h, A4h, etc.), while the downstream busses can be assigned addresses that do not conflict with other devices in the system, such as those in the ranges of Bxh, Cxh, Dxh and Exh, respectively. Thus, a master on the primary bus can uniquely address all of forty exemplary devices.

Figure 3:
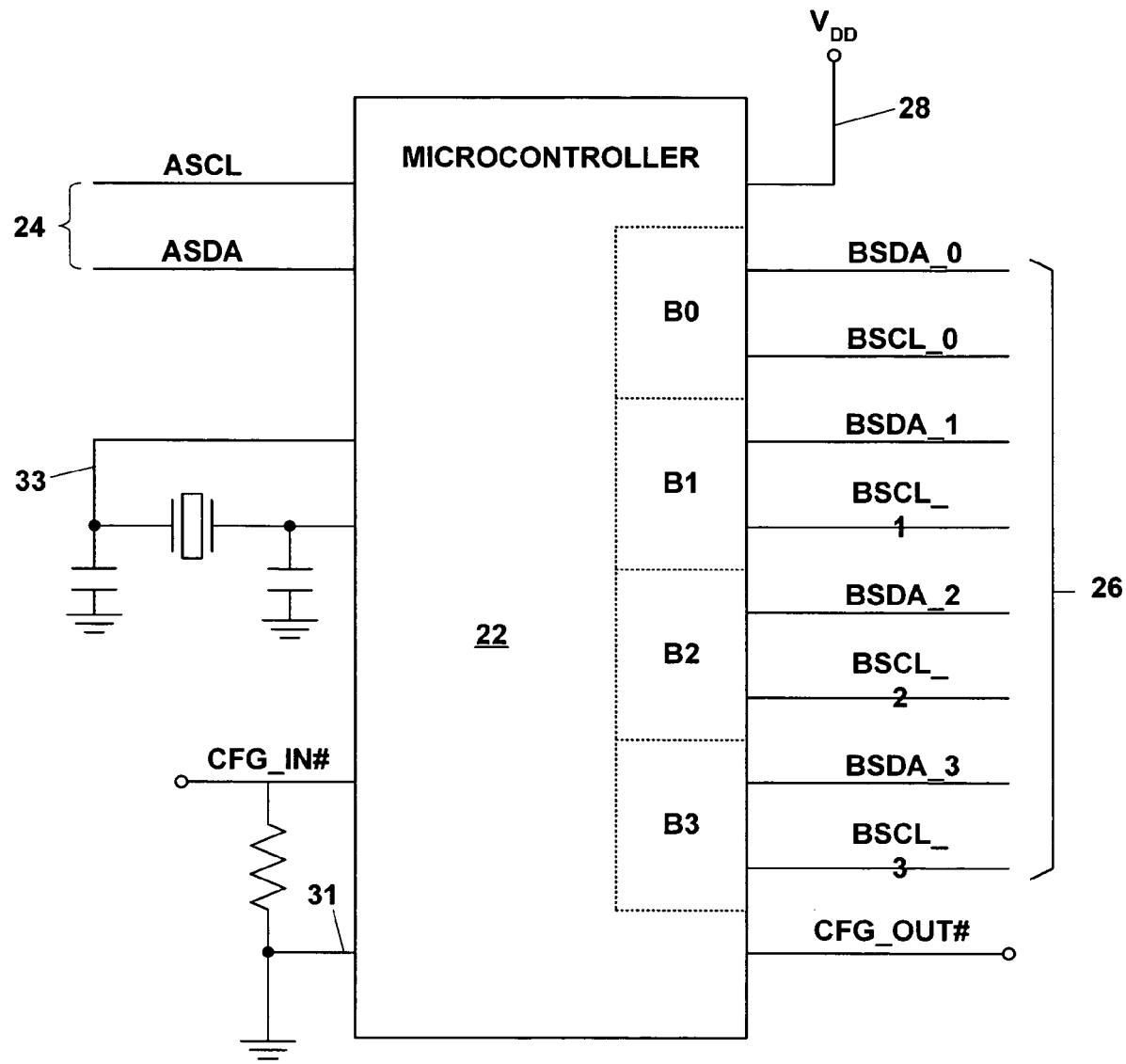
FIG. 3 is a graphic depiction of a microcontroller used to implement the address extending switching apparatus shown in FIG. 2.

In the preferred embodiment, the extender 18 is configured from a microcontroller. An example of such a microcontroller is an 87LPC764 microcontroller from Philips Semiconductor, which is in the 8051 family of microcontrollers. This microcontroller has many basic hardware elements used in the extender, including 4 kilobytes of one-time programmable PROM memory, several general purpose input/output ports, a reset pin and one I²C interface. A schematic view of a microcontroller 22 according to this embodiment is shown in FIG. 3.

The microcontroller 22 is connected to the two active conductors of upstream bus of the system labeled, respectively, ASCL and ASDA. The conductor pairs for each of four downstream busses 26, identified as B0, B1, B2 and B3, are also connected to the microcontroller 22. The conductor pairs of the downstream busses are identified, respectively, as BSCL_0 and BSDA_0, BSCL_1 and BSDA_1, BSCL_2 and BSDA_2, and BSCL_3 and BSDA_3. Other connections of the microcontroller include operating voltage $V_{DD}$ input 28, logic ground 31 and clock circuit 33. Those skilled in the art will recognize that this schematic figure is for illustrative purposes only, and some of the connections are not shown, such as the pull-up resistors for the bus signals.

When a transaction appears on the upstream bus, the address extender (as embodied by microcontroller 22) must determine whether to claim the transaction and forward it downstream, or whether to ignore it as one intended for a slave device on the upstream bus. To do this, the extender performs an address filtering using an internal address filter bitmap that, in the preferred embodiment, is sixteen bytes. The sixteen bytes in the address bitmap comprise 128 bits, which allows one bit for every possible device address in an I²C address space.

At the beginning of a transaction, the extender reads the entire eight-bit address (seven-bit address plus a read/write bit). If address filtering is enabled (discussed in more detail hereinafter), the extender uses the address to index into the address filter bitmap and to check the corresponding filter bit. If the bit is a "zero," then the extender determines that the transaction is intended for another device on the upstream bus, and ignores the current transaction until the start of a new transaction is detected. If the bit is a "one," then the extender proceeds with the routing and address translation procedures before forwarding the transaction to the appropriate downstream bus.

In the illustrative embodiment of the invention, the address filter bitmap comprises sixteen bytes, and resides in the internal register map of the extender, which is accessibly by a master on the primary bus via standard I²C read and write operations. With sixteen bytes, there are 128 bits total, giving one bit per seven-bit device address. Using this bitmap, a configuration host can control which addresses are ignored by the extender, and which are forwarded from the upstream bus to one of the downstream busses. Since there is only one bit per address, the address filter makes no distinction between a read operation or a write operation.

After address filtering, if the extender determines that the transaction is intended for a device on a downstream bus, the transaction must be routed to one of the downstream ports. This is done using a routing table that, in the preferred embodiment, amounts to thirty-two bytes in the internal address space of the extender, and therefore provides two bits of routing information for each of the 128 possible seven-bit I²C addresses. The two bits of routing information in the routing table are used to select which of the downstream interfaces will be the target of the forwarded transaction. For a given upstream bus address, the corresponding routing bits indicate the downstream bus to which the transaction will be routed, e.g., routing bits <00> indicate port B0, routing bits <01> indicate port B1, bits <10> indicate port B2 and bits <11> indicate port B3.

In the preferred embodiment in an I²C environment, the mapping of I²C addresses to routing table bit pairs is such that a first byte of the Routing Table corresponds to I²C addresses 00h through 07h, with bits <1:0>routing addresses 00h/01h, bits <3:2>routing addresses 02h/03h, and so on. Similarly, the second byte of the routing table corresponds to I²C addresses 08h through 0Fh. In this manner, the 32 bytes of the routing table comprise one bit-pair for each of the 128 I²C device addresses.

After address filtering and routing, the extender performs an address translation operation on every transaction being forwarded to one of the downstream bus interfaces. The unique addresses generated by masters on the primary bus are translated into the addresses used by the devices on the secondary busses. In the exemplary application of FIG. 2, the same addresses may be used by devices on each of the four secondary busses.

Figure 4:
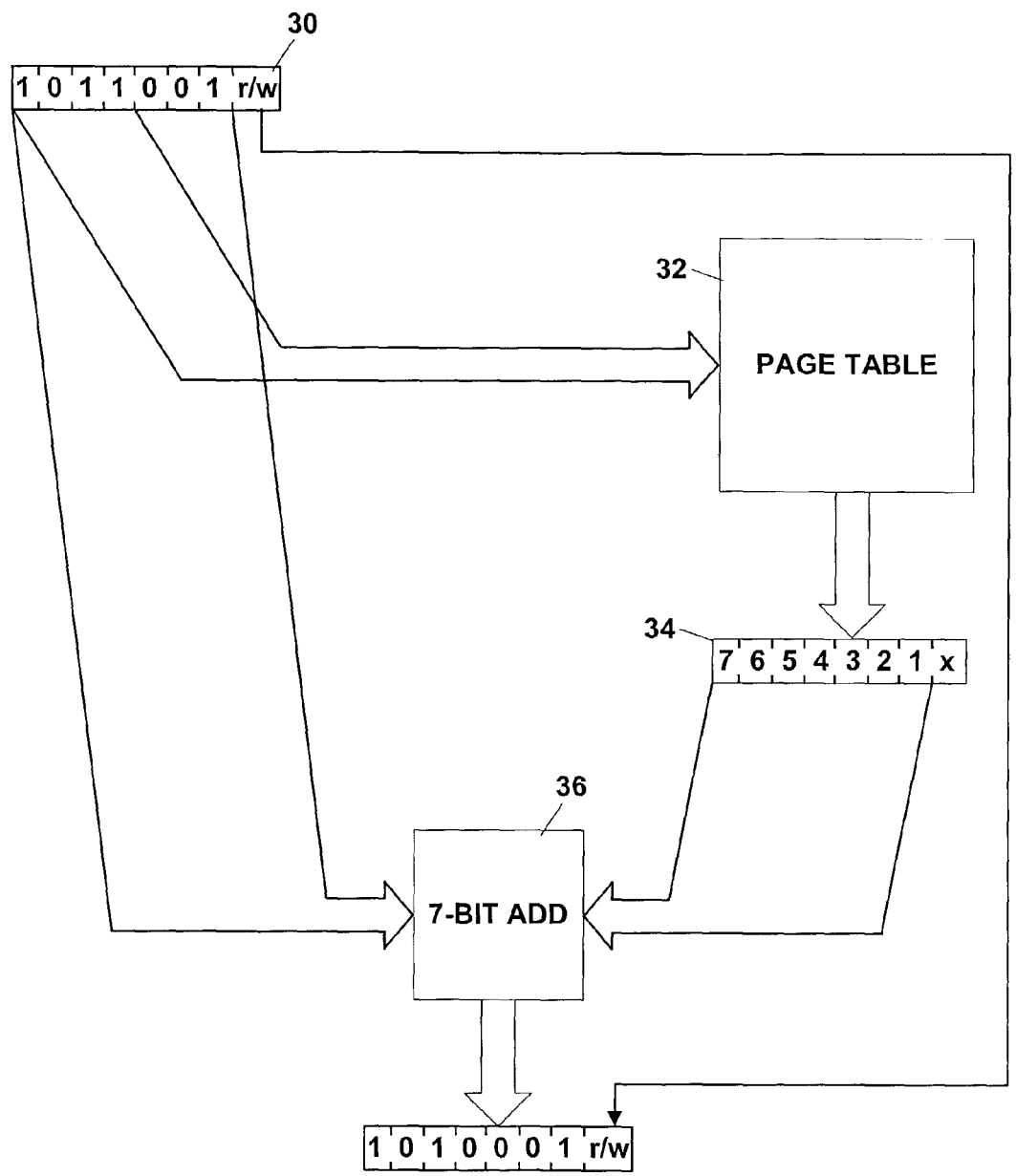
FIG. 4 is a schematic representation of an address translation strategy that may be used with the present invention.

Address translation according to the preferred embodiment of the invention is shown schematically in FIG. 4. The virtual address 30 from the upstream bus includes the 7-bit device address. The address translation function makes use of a page table 32. Each 8-bit entry of the page table is called a page table entry, and provides the address mapping for a group of eight device addresses. The contents of each page table entry is a 7-bit offset 34 that is added to the seven-bit device address 30, as shown schematically by seven-bit add function 36. Bit <0> of each page table entry is ignored by the add function. The combination of the input address 30 and the offset 34 produces the translated address, with the read/write bit being passed through. The particular page table entry to be used is selected from one of sixteen different entries by the upper four bits of the input device address. In the preferred embodiment, the offset for each page table entry is a signed 2's complement offset that is added to the input (virtual) address to form the physical address, which is subsequently sent to the appropriate downstream bus that is selected by the routing table.

In the illustrative embodiment of the invention, in which the extender is embodied in a microcontroller, several registers may also be used to control its features. The method for accessing the registers is similar to that used in prior art I²C devices. Register "write" operations are performed as I²C write operations with the first data byte being the index of the target register. This value is written to a write-only index register internal to the microcontroller. The subsequent data bytes of the I²C transactions are then copied into the registers pointed to by the contents of the index register, with the index register automatically incrementing following each data byte written. Thus, multiple register bytes may be written in a single I²C transaction. Register-read operations are performed using the well-known "write/read" I²C transaction syntax, in which the transaction starts out as a write operation to specify the register index value as the first data byte, but then the transaction switches to a read transaction via a repeated start condition.

Figure 5:
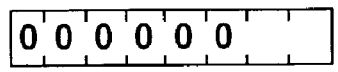
FIG. 5 is a schematic representation of a plurality of registers that may be used internally to a switching apparatus according to the present invention.
Figure 5:
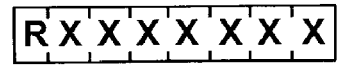
Figure 5:
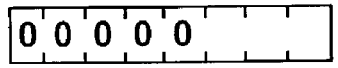

The following descriptions are of registers that may be used to implement certain control aspects of the invention, although it is anticipated that those skilled in the art may use alternate methods as well. Schematic representations of these registers are shown in FIG. 5.

Address filtering and address translation features may be separately enabled or disabled in the invention via register bits in a CONTROL register. The FILT_EN and TRANS_EN bits may be cleared by a hardware or software reset. When a "1" is written to the FILT_EN bit, address filtering is enabled. Likewise, writing a "1" to the TRANS_EN bit enables address translation.

A REVISION register provides an indication of the revision of the microcontroller firmware to software running on a configuration host. This information may be used by the host to take advantage of features or changes on a revision-by-revision basis. As indicated in FIG. 5, the upper bits <7:4> of the register indicate the major release level, while the lower bits <3:0> indicate the minor release level. For example, a revision of 1.7 would be indicated by a hexadecimal value of 17h.

The ADDRESS register of the extender stores the address of the extender itself. A master device could modify the contents of this register and by so doing assign a new slave address to the extender. The register assumes a value of 14h following a power-up or assertion of the RESET pin.

The RESET register can be used to initiate a software reset of the extender. In the preferred embodiment, writing to the register with the highest bit being a "1" will cause the extender to undergo a full reset, equivalent to the assertion of the RESET pin.

The STATUS register provides the configuration host with visibility into the status of several of the pins on the extender microcontroller. This register is read-only, and write operations to it have no effect. The upper five bits <7:3> are unused and always read as "0". As shown in FIG. 5, the lower three bits <2:0> indicate the status of the CFG_OUT pin, the CFG_IN pin and the AUTOCONFIG pin, respectively. In the preferred embodiment, the polarity of the bits is according to positive logic, that is, if a pin is at a logic "high", the status of that pin the register is indicated as "1".

In order to facilitate the use of large numbers of extenders on a single bus segment, the preferred embodiment of the extender uses an address configuration mechanism that allows a configuration host on the upstream bus to dynamically assign addresses to the various extenders in use. Thus, if a system needs several extenders, the system could assign addresses to the various extenders to use unoccupied addresses on the bus, thus avoiding conflicts with other devices.

Following a power-up reset or a software-generated reset, the extender device is in an unconfigured state. In this state, the address filtering and address translation features are disabled, and the extender reverts to a default address (14h in a preferred I$^2$C environment). In order for a system with multiple unconfigured extenders to be able to access each of them uniquely, the extender design incorporates two pins that form a configuration daisy-chain, as shown in FIG. 3.

The configuration pins, CFG_IN# and CFG_OUT#, are both "low-true." Extenders connected as peers on a single I$^2$C bus segment are chained together with the CFG_OUT# pin of one connected to the CFG_IN# pin of another. The extender at the head of the chain has its CFG_IN# strapped LOW. Thus, when in the unconfigured state, each extender assumes the same default address, but also qualifies the reception of this address with the state of its CFG_IN# pin. If a given extender receives the default address on its upstream port interface, but its CFG_IN# pin is high, then the transaction is ignored.

As a first part of the extender configuration following a reset, the configuration host on the upstream port bus performs a series of reads and writes to the default address. First, it attempts a read operation from the ADDRESS register at the default address. This will return a value representing the default address if there are any unconfigured extenders on the bus. Otherwise, this transaction will receive a negative acknowledgement on the I$^2$C bus indicating that there are no unconfigured extenders, and that the address assignment process is complete.

If the default address value is returned, the configuration host will assign a permanent address to the responding extender by writing a new address value to the ADDRESS register at the default address. Following this write, the initially responding extender is no longer responsive to the default address. The reconfigured extender responds to the address assignment by asserting its CFG_OUT# pin, which enables for address configuration the extender that has its CFG_IN# pin connected to the CFG_OUT# pin of the reconfigured extender. This configuration process continues until the read attempt of the configuration host receives a negative acknowledgement on the I$^2$C bus. In the preferred embodiment, the extenders will ignore any attempt to configure them with the default address.

Following the address configuration procedure, the upstream configuration host programs the page table, routing table and address filter bitmap of the extenders in use. Since address filtering is disabled at reset, an extender will pass no transactions to a downstream bus until the address filter function is enabled by asserting the FILTER_EN bit in the CONTROL register. In the preferred embodiment, the page table is programmed first, then the routing table, followed by the address filter bitmap. After all these data structures are properly initialized, the TRANS_EN and FILTER_EN bits may be set to "1" in the CONTROL register. If a system does not need the address translation feature, then the initialization of the page table may be skipped, and the TRANS_EN bit in the CONTROL register left as "0".

While the invention has been shown and described with reference to a preferred embodiment thereof, those skilled in the art will recognize that various changes in form and detail may be made herein without departing from the spirit and scope of the invention as defined by the appended claims.

What is claimed is:

1. A switching apparatus for facilitating communication between a first device connected to a primary communication bus and a second device connected to a secondary communication bus, the apparatus comprising:
    a first interface connected to the primary communication bus wherein the total number of devices communicating via the primary communication bus is greater than the available number of system addresses uniquely identifiable by the devices;
    a second interface connected to the secondary bus;
    a coupling path by which data can flow between the first interface and the second interface; and
    an address translator that reads a primary address used on the primary bus, determines whether it identifies a device on the secondary bus and, if so, converts it to a secondary address that is placed on the secondary bus, and enables said data flow between the first interface and the second interface.

2. An apparatus according to claim 1 wherein the secondary bus is one of a plurality of secondary busses to which a coupling path from the main bus can be established via a plurality of interfaces.

3. An apparatus according to claim 2 wherein a coupling path is established between the first interface and an interface associated with a particular one of the secondary busses, the particular secondary bus being determined by said primary address.

4. An apparatus according to claim 1 wherein devices communicating via the busses operate according to an I$^2$C protocol.

5. An apparatus according to claim 1 wherein the apparatus comprises a microcontroller via which the first and second interfaces, the coupling path and the address translator are configured.

6. An apparatus according to claim 1 wherein the address translator comprises an address filter bitmap, and wherein an address is used to index into the bitmap and the logic state of a bit thereby identified indicates whether the address identifies a device on the secondary bus.

7. An apparatus according to claim 1 wherein the secondary bus is one of a plurality of secondary busses to which a coupling path from the main bus can be established via a plurality of interfaces, and wherein the address translator comprises a routing table, the primary address being used by the address translator to identify a particular section of the routing table the data contents of which indicate to which of the secondary busses a coupling path is established from the main bus.

8. An apparatus according to claim 1 wherein the address translator comprises a page table containing a plurality of values each of which may be used for determining an address for a device on the secondary bus.

9. An apparatus according to claim 8 wherein the secondary bus is one of a plurality of secondary busses to which a coupling path from the main bus can be established via a plurality of interfaces, and wherein identical addresses may be used for devices on different secondary busses.

10. An apparatus according to claim 8 wherein the address from the main bus includes addressing data and a read/write indicator.

11. An apparatus according to claim 8 wherein devices on each secondary bus and devices on the main bus respond to the same addressing protocol.

12. An apparatus according to claim 11 wherein said protocol is an $I^2C$ protocol.

13. An apparatus according to claim 8 wherein the page table has entries that comprise offset values, and a destination address on a secondary bus is found by combining an offset value designated by an address received from the main bus with the address from the main bus.

14. An apparatus according to claim 13 wherein the secondary bus is one of a plurality of secondary busses to which a coupling path from the main bus can be established via a plurality of interfaces, and wherein the address translator further comprises a routing table, the address from the main bus being used to identify a particular section of the routing table the data contents of which indicate to which of the secondary busses a coupling path is established from the main bus.

15. An apparatus according to claim 1 wherein the apparatus is one of a plurality of switching apparatuses, each of which is also connected to the main bus and facilitates communication between a device on the main bus and a secondary bus particular to that switching apparatus, and wherein each apparatus comprises an interconnection mechanism that allows it to connect to other apparatuses so as to implement a sequential enabling of said apparatuses during an initialization procedure that allows only one apparatus at a time to receive data from a device connected to the main bus.

16. A switching apparatus for facilitating communication between a first device connected to a primary communication bus and a second device connected to one of a plurality of secondary communication busses to which the switching apparatus is connected, the apparatus comprising:

a primary interface connected to the primary bus wherein the total number of devices communicating via the primary communication bus and the secondary communication busses is greater than the available number of system addresses uniquely identifiable by the devices;

a plurality of secondary interfaces each connected to one of the secondary busses;

coupling paths by which data can flow between the primary interface and a selected one of the secondary interfaces; and an address translator that reads a primary address used on the primary bus, determines whether it identifies a device on one of the secondary busses and, if so, converts it to a secondary address that is placed on the appropriate secondary bus, and enables said data flow between the first interface and the second interface.

17. An apparatus according to claim 16 wherein devices communicating via the busses operate according to an $I^2C$ protocol.

18. An apparatus according to claim 16 wherein the apparatus comprises a microcontroller via which the first and second interfaces, the coupling paths and the address translator are configured.

19. An apparatus according to claim 16 wherein each apparatus comprises an interconnection mechanism that allows it to connect to other apparatuses so as to implement a sequential enabling of said apparatuses during an initialization procedure that allows only one apparatus at a time to receive data from a device connected to the main bus.

20. A method of facilitating communication between a first device connected to a primary communication bus and a second device connected to a secondary communication bus, the method comprising:

connecting to the primary bus with a first interface wherein the total number of devices communicating via the primary communication bus is greater than the available number of system addresses uniquely identifiable by the devices;

connecting to the secondary bus with a second interface; and reading, with an address translator, a primary address used on the primary bus and determining whether it identifies a device on the secondary bus and, if so, converting the primary address to a secondary address that is placed on the secondary bus and enabling a coupling path by which data can flow between the first interface and the second interface.

21. A method according to claim 20 wherein the secondary bus is one of a plurality of secondary busses to which a coupling path from the main bus can be established via a plurality of interfaces.

22. A method according to claim 21 wherein a coupling path is established between the first interface and an interface associated with a particular one of the secondary busses, the particular secondary bus being determined by said primary address.

23. A method according to claim 20 wherein devices communicating via the busses operate according to an $I^2C$ protocol.

24. A method according to claim 20 further comprising providing a microcontroller via which the first and second interfaces, the coupling path and the address translator are configured.

25. A method according to claim 20 wherein the address translator comprises an address filter bitmap, and wherein an address is used to index into the bitmap and the logic state of a bit thereby identified indicates whether the address identifies a device on the secondary bus.

26. A method according to claim 20 wherein the secondary bus is one of a plurality of secondary busses to which a coupling path from the main bus can be established via a plurality of interfaces, and wherein the address translator comprises a routing table, the primary address being used by the address translator to identify a particular section of the routing table the data contents of which indicate to which of the secondary busses a coupling path is established from the main bus.

27. A method according to claim 20 wherein the address translator comprises a page table containing a plurality of values each of which may be used for determining an address for a device on the secondary bus.

28. A method according to claim 27 wherein the secondary bus is one of a plurality of secondary busses to which a coupling path from the main bus can be established via a plurality of interfaces, and wherein identical addresses may be used for devices on different secondary busses.

29. A method according to claim 27 wherein the address from the main bus includes addressing data and a read/write indicator.

30. A method according to claim 27 wherein devices on each secondary bus and devices on the main bus respond to the same addressing protocol.

31. A method according to claim 30 wherein said protocol is an I²C protocol.

32. A method according to claim 27 wherein the page table has entries that comprise offset values, and a destination address on a secondary bus is found by combining an offset value designated by an address received from the main bus with the address from the main bus.

33. A method according to claim 32 wherein the secondary bus is one of a plurality of secondary busses to which a coupling path from the main bus can be established via a plurality of interfaces, and wherein the address translator further comprises a routing table, the address from the main bus being used to identify a particular section of the routing table the data contents of which indicate to which of the secondary busses a coupling path is established from the main bus.

34. A method according to claim 20 wherein the method comprises facilitating communication between a main bus and a plurality of buses with a plurality of switching apparatuses, each of which is connected to a different secondary bus, and wherein each apparatus comprises an interconnection mechanism that allows it to connect to other apparatuses so as to implement a sequential enabling of said apparatuses during an initialization procedure that allows only one apparatus at a time to receive data from a device connected to the main bus.

* * * * *